United States Patent
Gatfield et al.

(10) Patent No.: US 8,318,711 B2
(45) Date of Patent: *__Nov. 27, 2012__

(54) USE OF DIACETYL TRIMER AS AN AROMATIC AND FLAVOURING SUBSTANCE

(75) Inventors: Ian Gatfield, Höxter (DE); Jakob Ley, Holzminden (DE); Ingo Reiss, Holzminden (DE); Günter Kindel, Höxter (DE); Gerhard Krammer, Holzminden (DE)

(73) Assignee: Symrise AG, Holzminden (DE)

( * ) Notice: Subject to any disclaimer, the term of this patent is extended or adjusted under 35 U.S.C. 154(b) by 552 days.

This patent is subject to a terminal disclaimer.

(21) Appl. No.: 11/720,582

(22) PCT Filed: Nov. 30, 2005

(86) PCT No.: PCT/EP2005/056355
§ 371 (c)(1), (2), (4) Date: Feb. 24, 2009

(87) PCT Pub. No.: WO2006/058893
PCT Pub. Date: Jun. 8, 2006

(65) Prior Publication Data
US 2009/0208426 A1     Aug. 20, 2009

Related U.S. Application Data

(60) Provisional application No. 60/633,194, filed on Dec. 3, 2004.

(51) Int. Cl.
- *A01N 43/00* (2006.01)
- *A01N 35/00* (2006.01)
- *A61K 31/33* (2006.01)
- *A61K 31/12* (2006.01)

(52) U.S. Cl. ........................ 514/183; 514/675

(58) Field of Classification Search ................ 514/183, 514/675

See application file for complete search history.

(56) References Cited

OTHER PUBLICATIONS

Cresswell et al. ("The Structure of Two Trimers of Biacetyl" Journal of the Chemical Society, 1961, 4882-5).*

Fliss, H et al., "The Reaction of Chymotrypsin With 2 3 Butanedione Trimer", Canadian Journal of Biochemistry, vol. 53, No. 3, 1975, pp. 275-283.

Segura, D et al., "Diacetyl for Blocking the Histochemical Reaction for Arginine", Biotechnic and Histochemistry, vol. 69, No. 1, 1994, pp. 1-6.

Yankeelov, J.A, Jr., "Modification of arginine by diketones" Methods Enzymol, vol. 25, 1972, pp. 566-579.

Yankeelov, J.A, Jr. et al., "A simple trimerization of 2,3-butanedione yielding a selective reagent for the modification of arginine in proteins." Journal of the American Chemical Society, Mar. 13, 1968, vol. 90, No. 6, pp. 1664-1666.

Yankeelov, J.A, Jr., "Modification of Agrinie in Proteins by Oligomers of 2 3 Butanedione", Biochemistry, vol. 9, No. 12, 1970, pp. 2433-2439.

* cited by examiner

*Primary Examiner* — Yong Chong
(74) *Attorney, Agent, or Firm* — Roylance, Abrams, Berdo & Goodman, L.L.P.

(57) ABSTRACT

The invention relates to the use of 2,5-diacetyl-3a,5,6,6a-tetrahydro-6a-hydroxy-2,3a,5-trimethylfuro[2,3-d]-1,3-dioxole (diacetyl trimer) of the formula

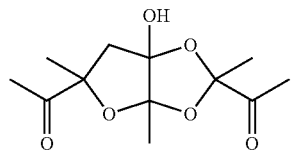

in the form of one of its stereoisomers or in the form of a mixture consisting of or containing two or more of the stereoisomers (i) as an odoriferous or aromatic substance, (ii) for imparting, intensifying and/or modifying a creamy and/or fatty sensation in the mouth, (iii) for imparting, intensifying and/or modifying a sweet, buttery, cream-like and/or creamy flavor, and/or (iv) for masking a bitter flavor. The invention furthermore relates to corresponding aromatic compositions as well as compositions which serve for nutrition, oral hygiene, consumption for pleasure or for oral pharmaceutical use.

16 Claims, No Drawings

USE OF DIACETYL TRIMER AS AN AROMATIC AND FLAVOURING SUBSTANCE

FIELD OF THE INVENTION

The invention relates to the use of 2,5-diacetyl-3a,5,6,6a-tetrahydro-6a-hydroxy-2,3a,5-trimethylfuro[2,3-d]-1,3-dioxole (diacetyl trimer) and the various stereoisomers or mixtures of diacetyl trimer as (an) aromatic or flavouring substance(s), in particular to the use as (an) aromatic or flavouring substance(s) in formulations serving for nutrition, oral hygiene or consumption for pleasure or oral pharmaceutical formulations. The invention also relates to formulations serving for nutrition, oral hygiene or consumption for pleasure comprising diacetyl trimer. In the context of this invention, the term "diacetyl trimer" is understood as meaning a stereoisomer of 2,5-diacetyl-3a,5,6,6a-tetrahydro-6a-hydroxy-2,3a,5-trimethylfuro[2,3-d]-1,3-dioxole and also a mixture containing or consisting of two or more of these stereoisomers, unless stated otherwise.

BACKGROUND OF THE INVENTION

The aromatic substance diacetyl (2,3-butanedione) is employed for aromatization of foodstuffs and/or compositions for consumption for pleasure which have a high fat content and taste of butter, such as e.g. margarines, formulations for the preparation of popcorn, sweet and salty baked goods. In this context, some or the total amount of the butter in the abovementioned formulations can be replaced by fats or oils which are cheaper and/or more favourable from the point of view of nutrition physiology, without influencing the desired butter flavour. Nevertheless, diacetyl is highly volatile and can therefore readily evaporate, especially in formulation processes which are accompanied by the action of heat, and can thus adversely influence the aroma of the finished product.

EP 0 293,957-A2 has proposed the use of precursor molecules of diacetyl, namely a diacetyl dimer of the formula

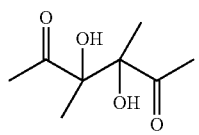

or an oligomerization product of diacetyl of the formula

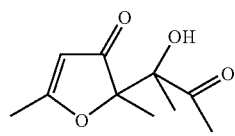

The molecules described there are destroyed by the action of heat and by spontaneous decomposition and thereby release diacetyl as an aromatic substance. A flavour impression of diacetyl dimer which differs from diacetyl is not described. A disadvantage of the use of a diacetyl dimer which remains is that diacetyl is formed directly as the sole constituent having an aromatizing action, with all its fundamental disadvantages of formulation.

During the reduction of the fat and/or oil content in foodstuffs, which is desirable from the point of view of nutrition physiology, the typical pleasantly creamy, fatty sensation in the mouth is lost. This sensation in the mouth cannot be compensated by aromatization with diacetyl or its precursor diacetyl dimer.

SUMMARY OF THE INVENTION

The object of the invention was to discover one or more aromatic substances which are capable a) of imitating the pleasantly creamy, fatty sensation in the mouth of high-fat products in low-fat products and at the same time b) of causing a buttery aroma impression.

DETAILED DESCRIPTION OF THE INVENTION

The invention therefore provides the use of 2,5-diacetyl-3a,5,6,6a-tetrahydro-6a-hydroxy-2,3a,5-trimethylfuro[2,3-d]-1,3-dioxole (diacetyl trimer) of the formula

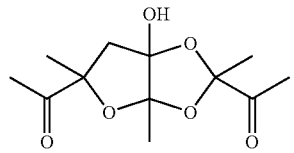

in the form of one of its stereoisomers or in the form of a mixture consisting of or containing two or more of the stereoisomers (i) as an odoriferous or aromatic substance, (ii) for imparting, intensifying and/or modifying a creamy and/or fatty sensation in the mouth, (iii) for imparting, intensifying and/or modifying a sweet, buttery, cream-like and/or creamy flavour, and/or (iv) for masking a bitter flavour.

The diacetyl trimer to be used according to the invention can be in the form of a pure enantiomer and/or diastereomer or in the form of a mixture in all possible ratios. The stereoisomers of diacetyl are:

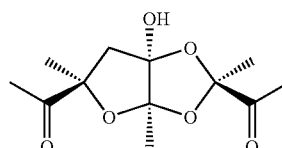

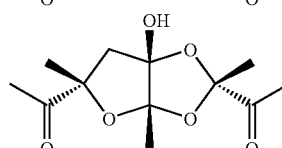

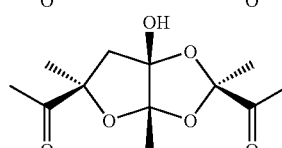

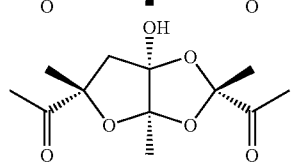

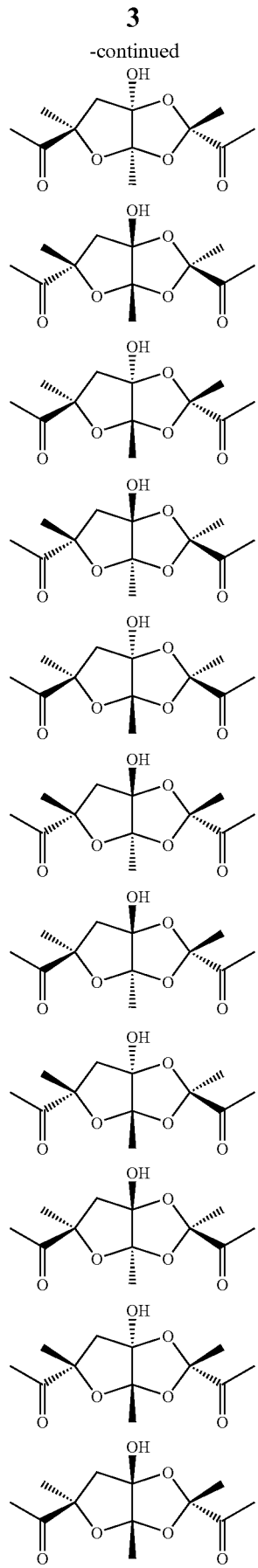

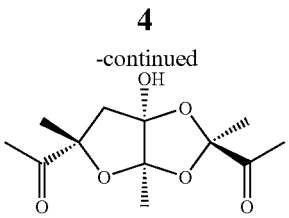

The stereoisomers in some cases differ slightly in their flavouring properties; they are indeed in some cases of different intensity, but all can in principle be used as an odoriferous or aromatic substance, for imparting, intensifying and/or modifying a creamy and/or fatty sensation in the mouth, for imparting, intensifying and/or modifying a sweet, buttery, cream-like and/or creamy flavour, and/or for masking a bitter flavour.

It is surprising and not foreseeable for the person skilled in the art that the diacetyl trimer to be used according to the invention (or one of its stereoisomers and/or a mixture consisting of or containing two or more of the stereoisomers) causes a very pleasantly soft, buttery flavour when tasted, but does not thereby cause an unpleasantly sharp and/or burning ortho- or retronasal smell impression like diacetyl. In particular, the pleasantly creamy, fatty sensation in the mouth (usually caused above all by fats and/or oils) is also perceived to a high degree at a low dosage of the diacetyl trimer to be used according to the invention, even if these fats and/or oils are absent. The diacetyl trimer to be used according to the invention also shows a markedly sweetness-intensifying and a bitterness-masking effect, in particular also in low-fat formulations, and compared with diacetyl has a high adhesion. Furthermore, diacetyl trimer is not very volatile and does not decompose even when heated at 60° C. to 100° C. for 10 minutes, or at least does so only so insignificantly that the characteristic flavour of the diacetyl trimer and its characteristic actions which differ from diacetyl are not lost.

The diacetyl trimer to be used according to the invention is known as such. Thus, the synthesis starting from diacetyl has been described e.g. by J. A. Jr. Yankeelov in Biochemistry, year 1970, volume 9, pages 2433-2439. However, there are no indications in the literature of a possible use of diacetyl trimer as aromatic substances or in formulations which serve for nutrition, oral hygiene or consumption for pleasure or oral pharmaceutical formulations. Further preparation processes and investigations of the stereoisomerism of diacetyl trimer are described in M. Poje, I. Perina, Tetrahedron vol. 41, no. 10, page 1985-1987, 1985 "The Stereostructure of two trimers of Biacetyl".

The present invention also provides formulations, semifinished goods and odoriferous, aromatic and flavouring substance compositions which comprise diacetyl trimer in a sensorially active amount.

In a preferred embodiment of the invention, the diacetyl trimer to be used according to the invention (that is to say one of its stereoisomers and/or a mixture consisting of or containing two or more of the stereoisomers) is used in combination with one or more aromatizing substances or aromatizing plant extracts. A particularly rounded-off sensorial profile can be achieved in appropriate formulations in this manner.

The present invention also provides aromatic compositions, and formulations which serve for nutrition, oral hygiene or consumption for pleasure and oral pharmaceutical formulations comprising diacetyl trimer in a sensorially active amount. Such formulations can utilize the advantageous actions of diacetyl trimer which are described above. For this, diacetyl trimer is expediently employed in an active amount for achieving a pleasantly creamy, fatty sensation in the mouth and/or for intensifying the flavour of fats and/or oils and/or for imitating the flavour of fats and/or oils. A particular advantage of such formulations is that the amount of fats and/or oils in these formulations can be reduced compared with formulations which are free from diacetyl trimer, or such fats and/or oils can even be dispensed with entirely.

The invention furthermore also relates to formulations which serve for nutrition, oral hygiene or consumption for pleasure and comprise sweeteners, comprising a sensorially active amount, preferably an active amount for achieving a pleasantly sweet flavour, of diacetyl trimer. A particular advantage of this formulation is that the content of other sweeteners in these formulations can be reduced compared with formulations which are free from diacetyl trimer.

These formulations according to the invention optionally comprise other conventional base substances, auxiliary substances and additives for foodstuffs and compositions for consumption for pleasure or formulations which serve for oral hygiene. The formulations as a rule comprise 0.0000001 wt. % to 1 wt. %, preferably 0.00001 to 1 wt. %, but particularly preferably 0.00001 wt. % to 0.1 wt. %, based on the total weight of the formulation, of diacetyl trimer. Further conventional base substances, auxiliary substances and additives for foodstuffs or compositions for consumption for pleasure or formulations which serve for oral hygiene can be present in amounts of from 0.0000001 to 99.9999999 wt. %, preferably 10 to 80 wt. %, based on the total weight of the formulation. The formulations can furthermore comprise water in an amount of up to 99.9999999 wt. %, preferably 5 to 80 wt. %, based on the total weight of the formulation.

The formulations which serve for nutrition or consumption for pleasure are e.g. baked goods (e.g. bread, dry biscuits, cakes, other baked products), confectionery (e.g. chocolate, chocolate bar products, other bar products, fruit gum, hard and soft caramels, chewing gum), alcoholic or non-alcoholic drinks (e.g. coffee, tea, wine, wine-containing drinks, beer, beer-containing drinks, liqueurs, schnapps, brandies, fruit-containing carbonated drinks, isotonic drinks, refreshing drinks, nectars, fruit and vegetable juices, fruit or vegetable juice formulations), instant drinks (e.g. instant cocoa drinks, instant tea drinks, instant coffee drinks), meat products (e.g. ham, fresh sausage or uncooked sausage formulations, seasoned or marinated fresh or salted meat products), eggs or egg products (dried egg, egg white, egg yolk), cereal products (e.g. breakfast cereals, muesli bars, precooked ready-made rice products, puffed rice or popcorn), dairy products (e.g. milk drinks, milk ice, yoghurt, kefir, fresh cheese, soft cheese, hard cheese, dried milk powder, whey, butter, buttermilk), fruit formulations (e.g. preserves, fruit-flavoured ice-cream, fruit sauces, fruit fillings), vegetable formulations (e.g. ketchup, sauces, dried vegetables, frozen vegetables, pre-cooked vegetables, cooked vegetables), nibbles (e.g. baked or fried potato chips or potato paste products, extrudates based on maize or peanuts), fat- or oil-based products or emulsions thereof (e.g. margarine, spreading products, mayonnaise, remoulade, dressings), other ready-made dishes and soups (e.g. dried soups, instant soups, precooked soups), spices, spice mixtures and, in particular, sprinkling spices (seasonings), which are used, for example, in the snacks sector.

The formulations in the context of the invention can also serve as semi-finished goods for the preparation of further formulations which serve for nutrition or consumption for pleasure. The formulations in the context of the invention can also be in the form of capsules, tablets (non-coated and coated tablets, e.g. coatings which are resistant to gastric juice), lacquered tablets, granules, pellets, solid mixtures, dispersions in liquid phases, emulsions, powders, solutions, pastes or other formulations as food supplements which can be swallowed or chewed.

It has also proved to be particularly advantageous that the diacetyl trimer to be used according to the invention, in particular in the preferred combination with further aromatizing substances and/or aromatizing plant extracts, imitates the pleasantly creamy, fatty sensation in the mouth of fats and/or oils in the formulations according to the invention, and it is therefore possible for the fat and/or oil content to be adjusted to a lower level or to be replaced completely, with the same sensorial evaluation.

Formulations which serve for oral hygiene are, in particular, dental care compositions, such as toothpastes, tooth gels, tooth powders, mouthwashes, chewing gums and other oral care compositions.

Oral pharmaceutical formulations in the context of the invention are formulations which e.g. are in the form of capsules, tablets (non-coated and coated tablets, e.g. coatings which are resistant to gastric juice), lacquered tablets, granules, pellets, solid mixtures, dispersions in liquid phases, emulsions, powders, solutions, pastes or other formulations which can be swallowed or chewed, which also comprise, in addition to diacetyl trimer to be employed according to the invention, other pharmaceutical active compounds or active compounds which are suitable for foodstuff supplements, and are used as medicaments which are available only on prescription or are available only from pharmacies or other medicaments or as food supplements.

Other pharmaceutical active compounds or active compounds which are suitable for foodstuff supplements can be e.g.: vitamins, minerals, antibiotics, bactericidal, fungicidal, antiviral, anthelmintic, antifungal or otherwise antimicrobially active compounds, agents against ageing, agents against internal diseases, e.g. cardiovascular diseases, agents against benign or malignant tumours (e.g. cytostatics), agents for prevention of cancer, for prevention or healing of dementia diseases, agents for improving cognitive performance, active compounds for lowering blood coagulation, agents against eye diseases, active compounds for lowering fever, and active compounds for reducing inflammatory diseases.

The formulations according to the invention are preferably embedded and/or encapsulated on and/or in a carrier, and are preferably in the form of capsules, tablets (non-coated and coated tablets, e.g. coatings which are resistant to gastric juice), lacquered tablets, granules, pellets, solid mixtures, dispersions in liquid phases, emulsions, powders, solutions, pastes or other formulations which can be swallowed or chewed as food supplements, microencapsulated, spray-dried, in the form of inclusion complexes or extrusion products, and are optionally added in this form to the intermediate and/or end product to be influenced in flavour. Diacetyl trimer processed in this manner has a particularly good stability, also for a relatively long time, and in many cases is easier to process than free diacetyl trimer, in particular in those processing steps which require heating of the goods to be processed.

Diacetyl trimer and formulations and products comprising diacetyl trimer can furthermore be adsorbed on a carrier which ensures both fine distribution of the diacetyl trimer in an end product or a semi-finished product and controlled release during use. Such carriers can be porous inorganic materials, such as light sulfate, silica gels, zeolites, gypsums, clays, clay granules, gas concrete etc., or organic materials, such as woods, cellulose-based substances, sugars or plastics, such as PVC, polyvinyl acetates or polyurethanes.

Formulations according to the invention which comprise diacetyl trimer can be prepared by incorporating diacetyl trimer (that is to say one of its stereoisomers and/or a mixture consisting of or containing two or more of the stereoisomers), as a solid, as a solution or in the form of a mixture with a solid or liquid carrier substance, into a base formulation which serves for nutrition, oral hygiene or consumption for pleasure. Advantageously, formulations according to the invention in the form of a solution are converted into a solid formulation by spray drying.

The properties of the formulations and products comprising diacetyl trimer can optionally be optimized further in respect of a more controlled release of aroma by so-called "coating" with suitable materials, for which purpose waxy materials, e.g. carnauba wax, are preferably used. For the preparation of a formulation according to the invention, according to a further preferred embodiment diacetyl trimer and optionally other constituents of the formulation according to the invention can be encapsulated or enclosed in capsules. Preferably, for this purpose diacetyl trimer and/or formulations comprising diacetyl trimer are first incorporated into emulsions, into liposomes, e.g. starting from phosphatidylcholine, into microspheres, into nanospheres or also into capsules, granules or extrudates of a matrix which is suitable e.g. for foodstuffs and compositions for consumption for pleasure, e.g. of starch, starch derivatives (e.g. modified starches), cellulose or cellulose derivatives (e.g. hydroxypropylcellulose), other polysaccharides (e.g. alginate, curdlan), natural fats, natural waxes (e.g. beeswax, carnauba wax) or of proteins, e.g. gelatine, or other natural products (e.g. shellac). In this context, depending on the matrix, the products can be used by spray drying, spray granulation, melt granulation, coacervation, coagulation, extrusion, melt extrusion, emulsion processes, coating or other suitable encapsulation processes. Particularly preferably, diacetyl trimer and/or a formulation comprising diacetyl trimer is encapsulated in a multi-component nozzle process, preferably with an immersed nozzle. Such encapsulation processes result in seamless capsules. A concentric two-component nozzle and/or a concentric three-component nozzle are preferably used in this context.

Seamless capsules having a liquid core and a shell surrounding this core are already known. They can be prepared, in particular, via a dripping process with a multi-component nozzle, which is also called a multi-component nozzle process in the context of the present text (cf. Bauer, Frömmig, Führer; Pharmazeutische Technologie; Wissenschaftliche Verlagsgesellschaft mbH, Stuttgart, 6th edition, 1999, p. 347). In the context of this text, references to the multi-component nozzle process here are also to be understood as meaning a reference to a large number of related processes for the preparation of seamless capsules.

In the multi-component nozzle process, capsules having a seamless shell are prepared in the manner of a dripping process. Conventionally, a lipophilic core material and a hot hydrophilic shell solution are pumped simultaneously through a concentric multi-component nozzle such that they drip into a cold lipophilic cooling liquid (cooling bath, curing bath), for example a plant oil. In this context, the nozzle can be immersed directly in the cooling liquid (submerged nozzle process). On dripping in, the capsules assume a ball shape (spherical shape) due to the surface tensions. Due to the lowering in temperature on contact with the cooling liquid, the seamless capsule shell solidifies.

The patent specifications U.S. Pat. No. 4,481,157 and U.S. Pat. No. 4,251,195 describe processes and apparatuses for the continuous preparation of seamless capsules by the multi-component nozzle process, in which the nozzle is immersed in the cooling liquid. These processes are particularly preferred in the context of the present invention.

In a further preferred preparation process, diacetyl trimer is first complexed with one or more suitable complexing agents, for example with cyclodextrins or cyclodextrin derivatives, preferably, β-cyclodextrin, and employed and/or encapsulated or enclosed in capsules as described above in this complexed form.

A formulation according to the invention in which the matrix is chosen such that diacetyl trimer is released from the matrix in delayed form, so that a long-lasting aroma action is obtained, is particularly preferred. A fat, wax, polysaccharide or protein matrix is particularly preferred here.

A microencapsulation of formulations and products comprising diacetyl trimer can be carried out, for example, by the co-called coacervation process with the aid of capsule materials e.g. of soft gelatine. The spray-dried formulations and/or products can be prepared, for example, by spray drying of an emulsion or dispersion containing diacetyl trimer, it being possible to use modified starches, proteins, dextrin and plant gums as carrier substances. Inclusion complexes can be prepared e.g. by introducing diacetyl trimer-containing dispersions and cyclodextrins into a suitable solvent, e.g. water. Extrusion products can be obtained by melting the formulations and products comprising diacetyl trimer with a suitable waxy substance and by extrusion with subsequent solidification, optionally in a suitable solvent, e.g. isopropanol.

Other constituents which can be used for formulations according to the invention which serve for nutrition or consumption for pleasure are further conventional base substances, auxiliary substances and additives for foodstuffs or compositions for consumption for pleasure, e.g. water, mixtures of fresh or processed, plant or animal base substances or raw materials (e.g. raw, roasted, dried, fermented, smoked and/or boiled meat, egg, bone, cartilage, fish, crustaceans and shellfish, vegetables, fruit, herbs, nuts, vegetable or fruit juices or pastes or mixtures thereof), digestible or non-digestible carbohydrates (e.g. sucrose, maltose, fructose, glucose, dextrins, amylose, amylopectin, insulin, xylans, cellulose), sugar alcohols, e.g. sorbitol, mannitol, xylitol), natural or hydrogenated fats (e.g. tallow, lard, palm fat, coconut fat, hydrogenated plant fat), fat oils (e.g. sunflower oil, groundnut oil, maize germ oil, thistle oil, olive oil, walnut oil, fish oil, soya oil, sesame oil), fatty acids or salts thereof (e.g. potassium stearate, potassium palmitate), proteinogenic or non-proteinogenic amino acids and related compounds (e.g. taurine, creatine, creatinine), peptides, native or processed proteins (e.g. gelatine), enzymes (e.g. peptidases, glucosidases, lipases), nucleic acids, nucleotides (inositol phosphate), flavour-modulating substances (e.g. sodium glutamate, 2-phenoxypropionic acid), substances which reduce or mask an unpleasant flavour (e.g. hydroxyflavanones according to EP 1,258,200), emulsifiers (e.g. lecithins, diacylglycerols), stabilizers (e.g. carrageenan, alginate, carob bean flour, guar bean flour), preservatives (e.g. benzoic acid, sorbic acid), antioxidants (e.g. tocopherol or derivatives thereof, ascorbic acid or derivatives thereof), chelating agents (e.g. citric acid), organic or inorganic acidifying agents (e.g. malic acid, acetic acid, citric acid, tartaric acid, phosphoric acid), bitter principles (e.g. quinine, caffeine, limonin), sweeteners, mineral salts (e.g. sodium chloride, potassium chloride, magnesium chloride, sodium phosphates), substances which prevent enzymatic browning (e.g. sulfite, ascorbic acid), essential oils, plant extracts, natural or synthetic dyestuffs or coloured pigments (e.g. carotenoids, flavonoids, anthocyans, chlorophyll and derivatives thereof), spices, as well as odoriferous substances, synthetic, natural or nature-identical aromatic and flavouring substances.

Sweeteners in the context of the invention can be, for example, sweet-tasting carbohydrates (e.g. sucrose, trehalose, lactose, maltose, melicitose, raffinose, palatinose, lactulose, D-fructose, D-glucose, D-galactose, L-rhamnose, D-sorbose, D-mannose, D-tagatose, D-arabinose, L-arabinose, D-ribose, D-glyceraldehyde, maltodextrin) or plant formulations comprising chiefly these carbohydrates (e.g. from sugar beet (*Beta vulgaris* ssp., sugar fractions, sugar syrup, molasses), from sugar cane (*Saccharum officinarum* ssp., e.g. molasses, sugar syrups), from sugar maple (*Acer* ssp.), from agave (agave thick juice), synthetic/enzymatic hydrolysates of starch or sucrose (e.g. invert sugar syrup, highly concentrated fructose syrups from maize starch), fruit concentrates (e.g. from apples or pears, apple leaf, pear leaf)), sugar alcohols (e.g. erythritol, threitol, arabitol, ribitol, xylitol, sorbitol, mannitol, dulcitol, lactitol), proteins (e.g. miraculin, monellin, thaumatin, curculin, brazzein), sweetening substances (magap, sodium cyclamate, acesulfame K, neohesperidin dihydrochalcone, saccharin sodium salt, aspartame, superaspartame, neotame, alitame, sucralose, stevioside, rebaudioside, lugduname, carrelame, sucrononate, sucrooctate, monatin, phyllodulcin), certain sweet-tasting amino acids (glycine, D-leucine, D-threonine, D-asparagine, D-phenylalanine, D-tryptophan, L-proline), other sweet-tasting low molecular weight substances, (e.g. hernandulcin, dihydrochalcone glycosides, glycyrrhizin, glycyrrhetic acid ammonium salt or other glycyrrhetic acid derivatives), extracts from liquorice (*Glycyrrhizza glabra* ssp.), extracts from *Lippia dulcis*, extracts or individual substances from *Momordica* ssp. (in particular *Momordica* grosvenori [Luo Han Guo] and the mogrosides obtained therefrom), from Hydrangea dulcis or from *Stevia* ssp. (e.g. *Stevia rebaudiana*).

Other constituents which can be used for the oral pharmaceutical formulations according to the invention are all the conventionally further active compounds, base substances, auxiliary substances and additives for oral pharmaceutical formulations. The active compounds, base substances, auxiliary substances and additives can be converted into the oral administration forms in a manner known per se. This is effected using inert, non-toxic, pharmaceutically suitable auxiliary substances. These include, inter alia, carrier substances (e.g. microcrystalline cellulose), solvents (e.g. liquid polyethylene glycols), emulsifiers (e.g. sodium dodecyl sulfate), dispersing agents (e.g. polyvinylpyrrolidone), synthetic and natural biopolymers (e.g. albumin), stabilizers (e.g. antioxidants, such as ascorbic acid), dyestuffs (e.g. inorganic pigments, such as iron oxides) or smell correctants as well as flavour correctants.

Preferably, formulations according to the invention comprise an aromatic composition in order to round off and refine the flavour and/or smell of the formulation. Suitable aromatic compositions comprise e.g. synthetic, natural or nature-identical aromatic substances and/or flavouring substances and/or odoriferous substances and/or aromatizing plant extracts.

The fat- and/or oil-containing formulations according to the invention are as a rule in the form of anhydrous lipophilic systems or in the form of aqueous emulsions, it being possible for them to be in the form of either "water-in-oil", "oil-in-water", "water-in-oil-in-water" or "oil-in-water-in-oil" emulsions.

Fats and oils in the context of the invention are all lipids which serve for nutrition or consumption for pleasure and are therefore toxicologically acceptable, for example naturally occurring or processed triglycerides, diglycerides or monoglycerides, fatty acid mono- or oligoesters of other polyhydric alcohols (e.g. of propylene glycol, carbohydrates or sugar alcohols), sterols or fatty acid esters thereof, phytosterols or fatty acid esters thereof, free fatty acids or salts thereof, estolides, fatty acid esters of primary alcohols (e.g. ethanol), phospholipids (e.g. phosphatidylcholine, lecithins, phosphatidylserine), ceramides and ceramide derivatives (e.g. sphingamines, cerebrosides, ceramides) and naturally occurring or synthetically prepared mixtures thereof.

A further aspect of the invention relates to the use of the formulations according to the invention as semi-finished goods, in particular with the aim of aromatization of finished goods produced from the semi-finished goods.

The formulations according to the invention, which preferably serve as semi-finished goods, preferably comprise 0.0001 wt. % to 95 wt. %, preferably 0.001 to 80 wt. %, but in particular 0.01 wt. % to 50 wt. %, based on the total weight of the formulation, of the diacetyl trimer to be used according to the invention (that is to say of one of its stereoisomers and/or a mixture consisting of or containing two or more of the stereoisomers) and optionally one or more other flavouring and aromatic substances as well as optionally one or more carrier and auxiliary substances and/or solvents.

EXAMPLES

Example 1

Characterization of Diacetyl Trimer

A racemic mixture which was prepared in accordance with the above-mentioned instructions of Yankeelov or Poje was used in the following examples. The mixture contained the following stereoisomers:

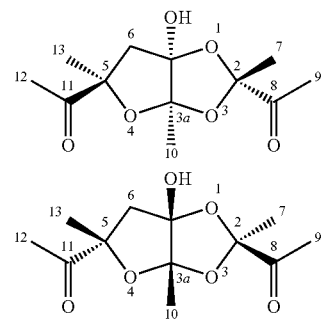

MS (EI, 70 eV): m/z=215 (6%), 155 (7%), 129 (16%), 111 (6%), 87 (13%), 85 (14%), 43 (100%).

$^1$H-NMR (400 MHz, CDCl$_3$): δ=4.67 (1H, bs, OH), 3.23 (1H, d, J=13.6 Hz, H-6), 2.35 (3H, s, H-12), 2.25 (3H, s, H-9), 1.92 (1H, d, J=13.6 Hz, H-6), 1.46 (3H, s, H-7), 1.40 (3H, s, H-10), 1.35 (3H, s, H-13) ppm.

$^{13}$C-NMR (100 MHz, CDCl$_3$): δ=210.42 (C, C-11), 208.05 (C, C-8), 114.49 (C, C6a), 112.50 (C, C-3a), 108.36 (C, C-2), 87.51 (C, C-5), 44.53 (CH$_2$, C-6), 25.10 (CH$_3$, C-9), 24.89 (CH$_3$, C-13), 24.87 (CH$_3$, C-12), 21.28 (CH$_3$, C-10), 20.90 (CH$_3$, C-7) ppm.

Example 2

Tasting in Sweet/Salty Solution

The 2,5-diacetyl-3a,5,6,6a-tetrahydro-6a-hydroxy-2,3a,5-trimethylfuro[2,3-d]-1,3-dioxole from Example 1 (1 ppm diacetyl trimer in aqueous 5 wt. % sucrose or 0.5% sodium chloride solution) was investigated for its flavouring action by 9 testers. The actions found were evaluated with a scale of from 1 (action scarcely perceptible) to 9 (action highly perceptible). The evaluation resulted in the following flavour profile for the diacetyl trimer: fatty (oily) (7), cream (6), butter (8), sweet (6), vanillin (3), caramel (4), toffee (6), fresh cheese/quark (4), intensity (6), impact (7), fullness (7), adhesive (8), soft (6)

For comparison, a flavour profile of diacetyl (1 ppm in aq. 5% sucrose or 0.5% sodium chloride solution) was produced under otherwise identical conditions: fatty (oily) (5), cream (5), butter (7), milk (4), condensed milk (4), fruity (2), cheesy (2), sweet (4), vanillin (2), intensity (7), impact (7), fullness (7), adhesive (5), soft (6)

Example 3

Intensification of the Sweetness Impression in an Aqueous Solution

In each case 2 samples (see below) were given in randomized sequence to a panel of 16 testers, with the request to indicate the sweetness intensity on a scale of from 1 (weak) to 10 (intense) and to describe the samples.

Of the 16 testers, 12 testers found sample 2 sweeter and 4 testers sample 1.
Result:

| Sample | Composition | Sweetness intensity | Flavour impression |
|---|---|---|---|
| Sample 1 | 5% strength sugar solution | 5.6 ± 1.3 | sweet |
| Sample 2 | 5% strength sugar solution + 10 ppb diacetyl trimer | 6.9 ± 1.2 | buttery, cream, creamy, fullness in the mouth, sweet, vanilla, caramel |

Example 4

Intensification of the Sweetness Impression in a Low-Fat Yoghurt

In each case 2 samples were given in randomized sequence to a panel of 15 testers, with the request to indicate the sweetness intensity on a scale of from 1 (weak) to 10 (intense) and to describe the samples. A yoghurt of the brand Optiwell 0.1% natur (Campina GmbH & Co. KG, Heilbronn) was used as the low-fat yoghurt.

Of the 15 testers, 13 testers found sample 2 sweeter and 2 testers sample 1.
Result:

| Sample | Composition | Sweetness intensity | Flavour impression |
|---|---|---|---|
| Sample 1 | Optiwell Joghurt 0.1% fat + 5% sugar | 5.1 ± 1.1 | sour |
| Sample 2 | Optiwell Joghurt 0.1% fat + 5% sugar + 1 ppm diacetyl trimer | 6.7 ± 2.0 | sweet, buttery, fullness in the mouth, fruity, syrup, milky, soft, creamy |

Example 5

Reduction of Bitter Flavour Directions

In each case 2 samples were given in randomized sequence to a panel of 16 testers, with the request to indicate the bitterness intensity on a scale of from 1 (weak) to 10 (intense) and to describe the samples.

Of the 16 testers, 9 testers found sample 2 less bitter, 5 testers sample 1 and 2 testers evaluated the two samples as the same.
Result:

| Sample | Composition | Bitterness intensity | Flavour impression |
|---|---|---|---|
| Sample 1 | 500 ppm aq. caffeine | 5.2 ± 2.3 | metallic, bitter |
| Sample 2 | 500 ppm aq. caffeine + 1 ppm diacetyl trimer | 4.6 ± 1.7 | buttery, fatty, soft, bitter, vanilla, cream |

Example 6

Half-Fat Margarine

| No. | Constituent | Wt. % content | Content/g |
|---|---|---|---|
| 1 | Hydrogenated plant fat (regular household goods) | 40.00 | 600.0 |
| 2 | Drinking water | 55.38 | 830.7 |
| 3 | Salt | 0.20 | 3.0 |
| 4 | Monoglyceride Monomuls 90-35 (Grünau/Cognis) | 0.80 | 12.0 |
| 5 | Citric acid | 0.02 | 0.3 |
| 6 | Whey protein | 1.50 | 22.5 |
| 7 | Lecithin | 2.00 | 30.0 |
| 8 | β-Carotene emulsion | | 8 drops |
| 9 | Aroma, containing 0.1% diacetyl trimer | 0.1 | 1.5 |

The water and fat were heated separately to approx. 55° C. The salt, citric acid, whey protein and β-carotene emulsion were stirred into the water and distributed homogeneously. The Monoglyceride Monomuls and lecithin were introduced into the fat phase and distributed uniformly. The aqueous phase was added slowly to the fat phase and the mixture was stirred first slowly (300 rpm) and then vigorously (1,500 rpm, 30 sec, blade insert, Ultraturrax). Finally, the aroma was stirred in. The mixture was cooled down to 35° C., transferred to containers and stored under cool conditions (5° C.).

The reduced-fat margarine obtained tastes similar to a full-fat margarine which is free from diacetyl trimer and has a fat content of 80 wt. %.

Example 7

Cream Ice-Cream

| No. | Constituent | % content | Content/g |
|---|---|---|---|
| 1 | Skimmed milk | 60.65 | 606.5 |
| 2 | Plant fat, melting range 35-40° C. | 16.50 | 165.0 |
| 3 | Sugar | 12.00 | 120.0 |
| 4 | Skimmed milk powder | 5.00 | 50.0 |
| 5 | Glucose syrup 72% dry matter | 5.00 | 50.0 |
| 6 | Emulgator SE 30 (Grindstedt Products, Denmark) | 0.65 | 6.5 |
| 8 | Aroma, containing 0.1% diacetyl trimer, 0.1% diacetyl and 1% vanillin | 0.20 | 2.0 |

The skimmed milk and glucose syrup were heated to 55° and the sugar, skimmed milk powder and emulsifier were added. The plant fat was preheated and the entire composition was heated to 58° C. After addition of the aroma, the mixture was homogenized (180/50 bar). The composition obtained was kept hot at 78° C. for 1 min and then cooled down to 2-4° C. and left to mature for 10 h. Thereafter, the matured composition was transferred to containers and stored in the frozen state at −18° C.

The reduced-fat ice-cream obtained tastes similar to a cream ice-cream which is free from diacetyl trimer and of otherwise the same composition with a fat content of 20%.

Example 8

Reduced-Fat Cheese Crackers

| No. | Constituent | % content | Content/g |
|---|---|---|---|
| 1 | Wheat flour type 405 | 60.00 | 600.0 |
| 2 | Plant fat | 7.44 | 74.4 |
| 3 | Glucose syrup | 1.64 | 16.4 |
| 4 | Cold tap water | 19.40 | 194.0 |
| 5 | Salt | 0.45 | 4.5 |
| 6 | Sodium bicarbonate | 0.44 | 4.4 |
| 7 | Whey powder | 2.00 | 20.0 |
| 8 | Sodium glutamate | 0.09 | 0.9 |
| 9 | Ammonium bicarbonate | 1.58 | 15.8 |
| 10 | Lactic acid | 0.22 | 2.2 |
| 11 | Sodium pyrosulfite | 0.02 | 0.2 |
| 12 | Ice/water | 0.58 | 5.8 |
| 13 | Cheese powder | 4.00 | 40.0 |
| 14 | Sugar | 1.79 | 17.9 |
| 15 | Aroma, containing 0.1% diacetyl trimer | 0.35 | 3.5 |

All the ingredients were introduced into a precooled Z mixer at 75 rpm and kneaded until the dough had a temperature of 25° C. (approx. 10 min). The dough was left to rest for 15 min and then rolled out, left to rest for 10 min, shaped and baked at 230° C. for approx. 5 min. After the baking, the hot crackers were sprayed immediately with a plant oil emulsion.

The reduced-fat crackers obtained tasted similar to crackers which are free from diacetyl trimer and of otherwise the same composition with a fat content of 20-25%.

Example 9

Reduced-Fat Sweet Biscuits

| No. | Constituent | % content | Content/g |
|---|---|---|---|
| 1 | Wheat flour 405 | 60.00 | 300 |
| 2 | Baking margarine | 13.00 | 65 |
| 3 | Sugar | 10.00 | 50 |
| 4 | Invert sugar syrup | 10.00 | 50 |
| 5 | Milk | 5.40 | 27 |
| 6 | Baking powder | 0.70 | 3.5 |
| 7 | Salt | 0.50 | 2.5 |
| 8 | Aroma, containing 0.1% diacetyl trimer | 0.15 | 0.75 |
| 9 | Mono-diglyceride emulsifier | 0.25 | 1.25 |

All the ingredients were introduced into a precooled Z mixer at 75 rpm and kneaded until the dough had a temperature of 25° C. (approx. 10 min). The dough was left to rest for 15 min and then rolled out, left to rest for 10 min, shaped and baked at 230° C. for approx. 5 min.

The reduced-fat biscuits obtained tasted similar to biscuits which are free from diacetyl trimer and of otherwise the same composition with a fat content of 20-30%.

Example 10

Seamless Capsules for Direct Consumption

The constituents for the shell mixture given in the following table were brought together and heated at 80° C. in a water-bath until a clear solution substantially free from air bubbles was formed. Solutions having dry matter contents of 20-40 wt. % are preferably used.

| Capsule diameter [mm] | Shell thickness [μm] | Shell content [wt. %] | Core content [wt. %] | Composition of shell | Composition of core | Dissolving in the mouth [sec] |
|---|---|---|---|---|---|---|
| 5 | 64 | 9 | 91 | 70% pig gelatine, 260 bloom 20% glycerol 9% water 0.5% aspartame 0.5% acesulfame K | 40% aroma with diacetyl trimer 60% plant oil | 40 sec |

The core liquid containing diacetyl trimer is provided at 10 to 20° C. The shell liquid and core liquid are fed via a pump system to a concentric two-component nozzle. During this operation, the line for the shell liquid is kept at 60 to 80° C. The concentric two-component nozzle is immersed in a liquid bath filled with plant oil. The temperature of this oil bath is approx. 10 to 15° C.

The stream of liquid emerging from the nozzle into the oil base breaks down, assisted by additional vibratory agitation of the liquid, into individual drops, which are seamless capsules of core and shell.

The still wet capsules are separated from the adhering oil by centrifugation and are then dried under constant agitation in a dry stream of air. Conventional fluidized bed dryers or drum dryers can be used. A prerequisite for a good drying success is that the capsules can be kept agitated by rotation or by air turbulence. In some cases, the use of a flow auxiliary is advisable for this. However, the use of a flow auxiliary is not always desirable. A transparent and shiny shell is achieved if the composition of the shell mixture is chosen such that a flow auxiliary, such as, for example, silica, can be dispensed with during drying, and sticking of the capsules nevertheless does not occur.

The invention claimed is:

1. A composition comprising a foodstuff or a product for consumption and 2,5-diacetyl-3a,5,6,6a-tetrahydro-6a-hydroxy-2,3a,5-trimethylfuro[2,3-d]-1,3-dioxole according to formula (I) in the form of one of its stereoisomers or in the form of a mixture of two or more of the stereoisomers

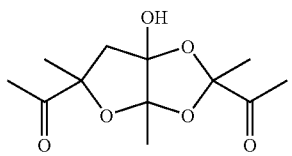

(I)

said compound of Formula (I) being present in the composition in an amount effective to
(i) provide an odoriferous or aromatic substance,
(ii) impart, intensify or modify a creamy or fatty sensation of said composition in the mouth,
(iii) impart, intensify or modify a sweet, buttery, cream-like or creamy flavour, and/or
(iv) mask a bitter flavour of the composition.

2. An aromatic composition, comprising a mixture of an aromatic plant extract and a sensorially effective amount of 2,5-diacetyl-3a,5,6,6a-tetrahydro-6a-hydroxy-2,3a,5-trimethylfuro[2,3-d]-1,3-dioxole (diacetyl trimer) according to formula (I)

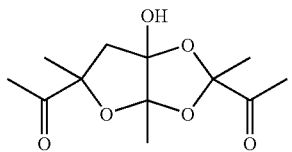

(I)

in the form of one of its stereoisomers or in the form of a mixture consisting of or containing two or more of the stereoisomers, said compound of formula (I) being present in an effective amount to enhance the aroma of said aromatic composition and said aromatic substance, and where said aromatic plant extract is present in an amount effective to impart an aroma to said aromatic composition.

3. A composition or product comprising a substance selected from the group consisting of a nutritional food product, oral hygiene formulation, formulation for consumption for pleasure and oral pharmaceutical composition, said composition or product further comprising, in a sensorially effective amount, 2,5-diacetyl-3a,5,6,6a-tetrahydro-6a-hydroxy-2,3a,5-trimethylfuro[2,3-d]-1,3-dioxole (diacetyl trimer) according to formula (I)

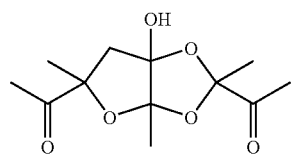

(I)

in the form of one of its stereoisomers or in the form of a mixture consisting of or containing two or more of the stereoisomers in an amount of 0.0000001 wt % to 1 wt % based on the weight of the composition or product.

4. A composition according to claim 2 further comprising an encapsulating agent or carrier for the diacetyl trimer.

5. The composition of claim 1, wherein said compound of formula (I) is a racemic mixture of two stereoisomers.

6. The composition of claim 1, wherein said compound of formula (I) is a single stereoisomer.

7. The composition of claim 1, wherein said compound of formula (I) is present in an amount of 0.0000001 wt % to 1 wt % based on the total weight of the composition.

8. The composition of claim 2, wherein said compound of formula (I) is present in an amount of 0.0000001 wt % to 1 wt % based on the total weight of the composition.

9. The composition of claim 3, wherein said compound of formula (I) is present in an amount effective to impart a pleasant, creamy, fatty sensation in the mouth, to intensify the flavor of fats or oils, or to imitate the flavor of fats or oils.

10. The composition of claim 3, wherein said composition includes a sweetener and said compound of formula (I) is present in an amount effective to enhance a sweet flavor of said composition.

11. The composition of claim 3, wherein said composition includes a component providing a bitter flavor and where said compound of formula (I) is present in an amount effective to mask the bitter flavor.

12. The composition of claim 3, wherein said composition includes an edible fat or oil and said compound of formula (I) is present in an amount effective to impart, intensify or modify a creamy, fatty sensation in the mouth or to impart, intensify or modify a sweet, buttery, cream-like or creamy flavor to said composition.

13. The aromatic composition of claim 2, wherein said composition is a consumable composition.

14. The composition of claim 3, wherein said composition is an oral pharmaceutical composition.

15. The composition of claim 3, wherein said composition is an oral hygiene composition selected from the group consisting of toothpaste, tooth gel, tooth powder and chewing gum.

16. The composition of claim 2, wherein said composition further includes an edible fat or oil and said compound of formula I is present in an amount effective to impart a pleasant, creamy, fatty sensation in the mouth, to intensify the flavor of fats or oils or to imitate the flavor of fats or oils.

* * * * *